United States Patent
Funabashi et al.

(10) Patent No.: US 9,926,915 B2
(45) Date of Patent: Mar. 27, 2018

(54) WIND POWER GENERATION SYSTEM

(71) Applicant: Hitachi, Ltd., Chiyoda-ku, Tokyo (JP)

(72) Inventors: Shigehisa Funabashi, Tokyo (JP);
Yasushi Shigenaga, Tokyo (JP); Shingo Inamura, Tokyo (JP); Masaru Oda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 680 days.

(21) Appl. No.: 14/445,219

(22) Filed: Jul. 29, 2014

(65) Prior Publication Data
US 2015/0091307 A1  Apr. 2, 2015

(30) Foreign Application Priority Data
Sep. 30, 2013 (JP) .................. 2013-202963

(51) Int. Cl.
*F03D 9/00* (2016.01)
*F03D 1/00* (2006.01)
(Continued)

(52) U.S. Cl.
CPC ............... *F03D 9/002* (2013.01); *F03D 1/00* (2013.01); *F03D 9/25* (2016.05); *F03D 80/60* (2016.05);
(Continued)

(58) Field of Classification Search
CPC .......... F03D 9/002; F03D 80/00; F03D 80/60; F03D 80/80; F03D 80/88; F03D 9/25;
(Continued)

(56) References Cited

U.S. PATENT DOCUMENTS 4,249,626 A * 2/1981 Fields ................. F28D 1/05383
165/47
5,505,257 A * 4/1996 Goetz, Jr. ............... F28F 1/126
165/152
(Continued)

FOREIGN PATENT DOCUMENTS

DE         27 42 559 B1    10/1978
JP        2009-185641 A     8/2009
(Continued)

OTHER PUBLICATIONS

Canadian Office Action issued in counterpart Canadian Application No. 2,856,585 dated Mar. 18, 2016 (four (4) pages).
(Continued)

*Primary Examiner* — Dwayne J White
*Assistant Examiner* — Justin A Pruitt
(74) *Attorney, Agent, or Firm* — Crowell & Moring LLP

(57) ABSTRACT

A wind power generation system includes: blades configured to be rotated by wind; a generator configured to be driven by the rotation of the blades to generate power; a nacelle supporting the blades; and a tower supporting the nacelle rotatably. The wind power generation system is configured to receive the wind at a side opposite to a side of the nacelle on which the blades are provided. The system includes a radiator configured to dissipate heat in the nacelle through a cooling medium. The radiator is provided outside the nacelle on an upwind side of the nacelle. The radiator is provided with an intake surface thereof facing an upwind direction. A path is formed downstream of the radiator to guide the wind that has passed the radiator.

15 Claims, 4 Drawing Sheets

(51) Int. Cl.
*F03D 9/25* (2016.01)
*F03D 80/60* (2016.01)

(52) U.S. Cl.
CPC ... *F05B 2240/14* (2013.01); *F05B 2240/2213* (2013.01); *Y02E 10/721* (2013.01); *Y02E 10/726* (2013.01)

(58) Field of Classification Search
CPC .................. F03D 1/00; F05B 2260/20; F05B 2240/2213; F05B 2240/14; Y02E 10/726
USPC ........................................................ 415/220
See application file for complete search history.

(56) References Cited

U.S. PATENT DOCUMENTS

| | | |
|---|---|---|
| 5,876,181 A | 3/1999 | Shin |
| 2004/0025093 A1 | 2/2004 | Willy et al. |
| 2004/0096327 A1 | 5/2004 | Appa et al. |
| 2004/0178639 A1 | 9/2004 | Wobben |
| 2009/0046289 A1 | 2/2009 | Caldwell et al. |
| 2009/0047129 A1 | 2/2009 | Yoshida |
| 2010/0090463 A1 | 4/2010 | Nies et al. |
| 2010/0207479 A1 | 8/2010 | Madawala |
| 2011/0082598 A1 | 4/2011 | Boretto et al. |
| 2011/0175355 A1 | 7/2011 | Rosenvard |
| 2011/0215640 A1 | 9/2011 | Donnelly et al. |
| 2011/0248512 A1 | 10/2011 | Lee |
| 2012/0074710 A1* | 3/2012 | Yoshida ................. F03D 9/002 290/55 |
| 2012/0086215 A1 | 4/2012 | Sivalingam et al. |
| 2012/0148407 A1* | 6/2012 | Akashi .................... F03D 80/00 416/95 |
| 2012/0156053 A1* | 6/2012 | Stiesdal ................. F03D 11/00 416/93 R |
| 2012/0282095 A1 | 11/2012 | Munk-Hansen et al. |
| 2013/0113212 A1 | 5/2013 | Sakamoto et al. |
| 2013/0229017 A1* | 9/2013 | Tobinaga ................ F03D 9/002 290/55 |

FOREIGN PATENT DOCUMENTS

| | | |
|---|---|---|
| JP | 2012-72684 A | 4/2012 |
| JP | 2012-233481 A | 11/2012 |
| JP | 2013-181498 A | 9/2013 |
| WO | WO 2013/111259 A1 | 8/2013 |
| WO | WO 2013/021487 A1 | 3/2015 |

OTHER PUBLICATIONS

English-language translation of Japanese Office Action issued in counterpart Japanese Application No. 2013-202963 dated Oct. 18, 2016 (four (4) pages).

* cited by examiner

US 9,926,915 B2

WIND POWER GENERATION SYSTEM

BACKGROUND OF THE INVENTION

1. Field of the Invention

The present invention relates to a wind power generation system that uses natural wind to cool an internal device.

2. Description of the Related Art

In a typical wind power generation system, a rotor, which is rotated by blades, is supported through a main shaft by a nacelle located at the top of a tower. The nacelle often houses a generator, which is rotated by the rotation of the main shaft of the blades. To obtain a suitable rotational speed of the generator, a gearbox is located between the rotor and the generator to increase the rotational speed of the generator in some cases. Electric energy generated by the generator is converted by a power converter and a transformer to electric power that can be supplied to a utility grid.

Devices housed in the wind power generation system, such as the generator, the gearbox, the power converter, and the transformer, generate heat, which is the loss from the devices. Hence, there is a demand for a cooling system that enables such generated heat to dissipate, so that the devices can be operated at appropriate temperatures. Systems using a heat dissipator (radiator) and/or a fan are often used to dissipate the heat eventually into water or atmosphere outside the wind power generation system. A cooling system described in JP 2012-233481 A includes no fan, which is a moving part. This document describes an arrangement with a cooling device (a radiator) provided on the top of a nacelle for cooling by natural wind in order to remove the heat of a wind power generation system into the ambient air. An arrangement described in JP 2012-072684 A cools a transformer and a generator located in a nacelle with air introduced into the nacelle by natural wind. An example of an upwind type windmill is described in JP 2009-185641 A, which includes a nacelle having a vent hole in its upwind wall and a heat exchanger is provided at this vent hole.

SUMMARY OF THE INVENTION

For the arrangements described in JP 2012-233481 A and JP 2012-072684 A, which use natural wind to allow heat inside the wind power generation systems to dissipate into the ambient air as described above, it is important to introduce a large quantity of air to the radiator or the devices to be cooled in order to cool the devices efficiently. Additionally, wind power generation systems demand mitigation of wind load and reduction in size and weight of a nacelle for improved reliability and reduced costs. Furthermore, for efficient and stable power generation, it is desirable to curb waste and disturbance, caused by the location and configuration of a nacelle and a radiator, of wind to be applied to blades. It is therefore an object of the present invention to provide a wind power generation system including a path arrangement that facilitates maintaining an air quantity for cooling by natural wind to achieve effective cooling in a nacelle.

As a solution to the issues described above, an arrangement described in the claims, for example, is employed.

The present application includes more than one solution to the issues described above. One example is a wind power generation system including: blades configured to be rotated by wind; a generator configured to be driven by the rotation of the blades to generate power; a nacelle supporting the blades; and a tower supporting the nacelle rotatably, the wind power generation system being configured to receive the wind at a side opposite to a side of the nacelle on which the blades are provided, the system including a radiator configured to dissipate heat in the nacelle through a cooling medium, wherein the radiator is provided outside the nacelle on an upwind side of the nacelle, the radiator is provided with an intake surface thereof facing an upwind direction, and a path is formed downstream of the radiator to guide the wind that has passed the radiator.

This invention allows a wind power generation system to be provided, which includes a path arrangement that facilitates maintaining an air quantity for cooling by natural wind in order to achieve effective cooling in a nacelle.

DESCRIPTION OF THE PREFERRED EMBODIMENTS

Some embodiments of the invention will now be described with reference to the drawings.

First Embodiment

A first embodiment will now be described with reference to FIGS. 1 and 2.

Figure 1:
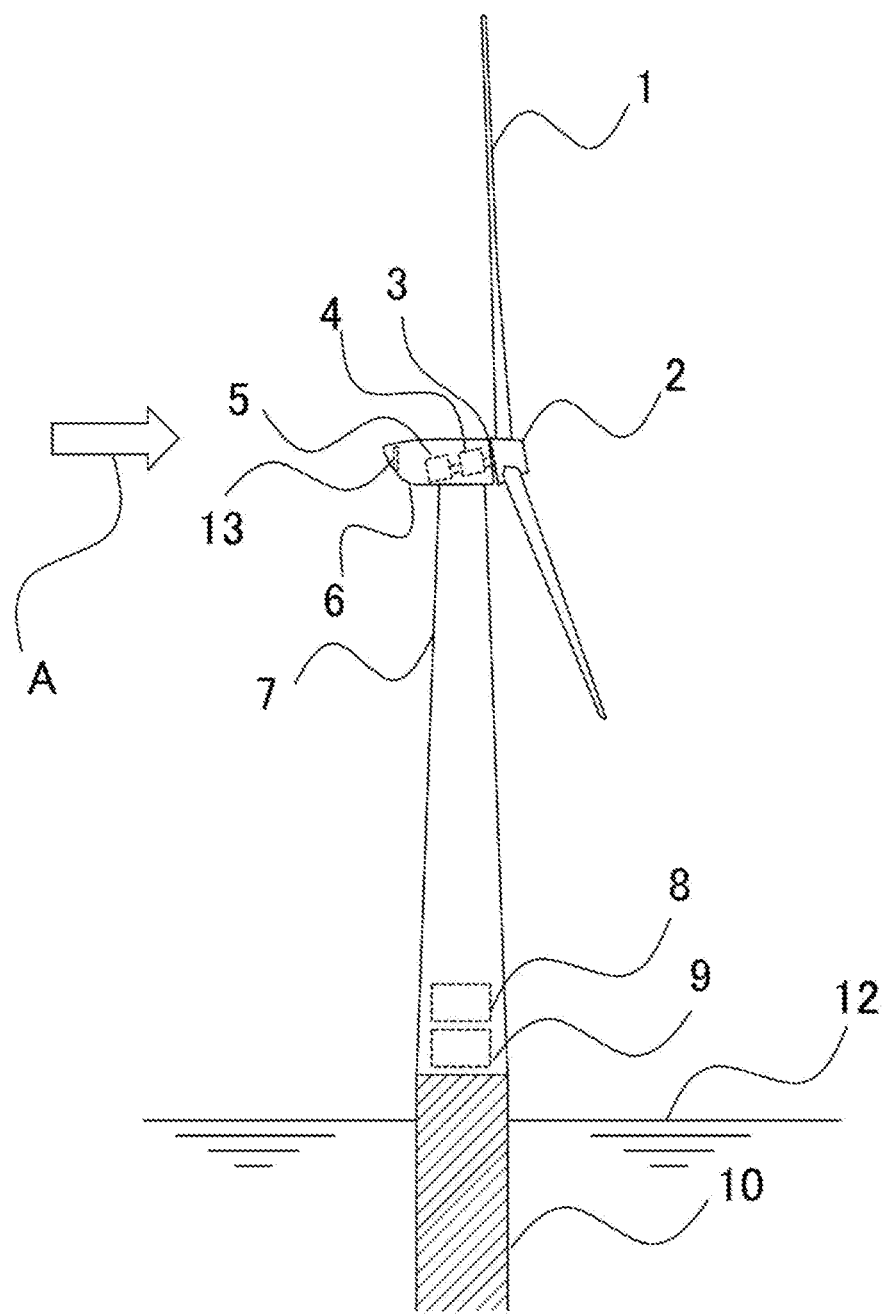
FIG. 1 is a schematic view of a wind power generation system for offshore installation according to a first embodiment.

FIG. 1 is a schematic view of a wind power generation system for offshore installation according to the first embodiment. The wind power generation system includes a tower 7, which is installed offshore to protrude from underwater, and a nacelle 6, which is located at the top of the tower 7. The nacelle 6 supports pivotally a rotor 2 provided with blades 1 and a hub (not shown). The rotor 2 is connected through a main shaft 3 and a gearbox 4 to a generator 5. The generator 5 is connected through a power cable (not shown) to electrical items, such as a power converter 8 and a transformer 9, housed in a lower portion of the tower 7. The wind power generation system uses a coolant, which contains antifreeze, as a cooling medium to cool the generator 5 and the gearbox 4. The wind power generation system includes a radiator 13 into which the coolant is introduced. The radiator 13 is supported on an exterior of the nacelle by a supporting member formed by extending a flank surface of the radiator at its discharge side. Alternatively, the radiator 13 is enclosed in a radiator supporting member. The cooling medium that flows through the radiator may be oil or the like.

Figure 2:
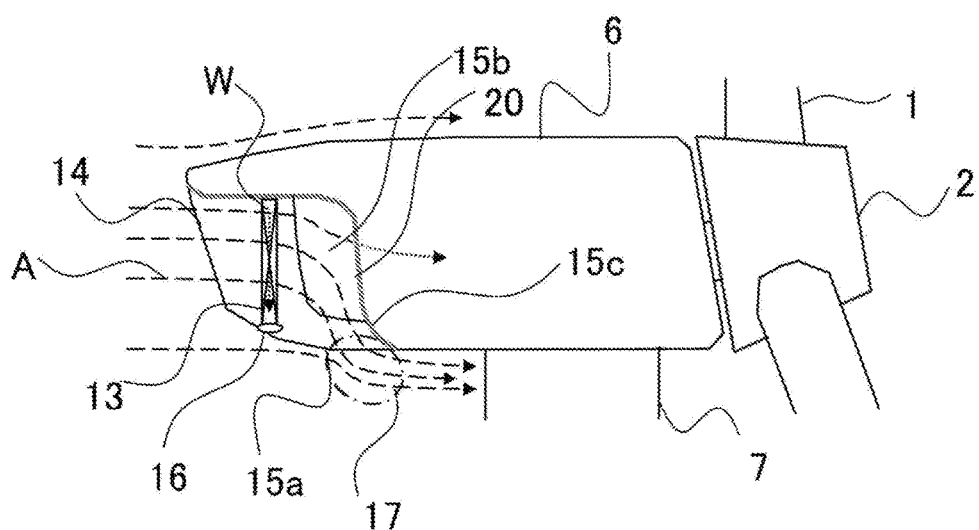
FIG. 2 is a schematic side view of a nacelle of the wind power generation system according to the first embodiment.

FIG. 2 is a schematic side view of the nacelle 6 of the wind power generation system according to the first embodiment. Note that FIG. 2 includes a sectional side view of the radiator 13 and its surroundings to describe an arrangement of the radiator 13. With wind blowing from the left to the right in the figure, the nacelle 6 receives the wind on the side opposite to the side on which the blades 1 are provided. The wind power generation system, which is of the downwind type, has the blades 1 located downstream of the tower 7.

For convenience, the side of the nacelle 6 on which the blades 1 are provided is referred to as the downwind side, and the side opposite to the side of the nacelle 6 on which the blades 1 are provided is referred to as the upwind side. A direction in which the blades 1 are provided with respect to the nacelle 6 is referred to as a blade direction of the nacelle 6, and a direction in which the nacelle receives wind with respect to the nacelle 6 is referred to as a rear direction of the nacelle 6. The side of the nacelle 6 on which the tower 7 is joined is referred to as the bottom, the opposite side as the top, and surfaces other than the top and the bottom and substantially parallel to the wind as flanks.

The nacelle 6 is at its upwind side provided with the radiator 13 with an intake surface of the radiator 13 facing the upwind direction. The radiator 13 is arranged so that the coolant, which has cooled the generator, the gearbox, or heat accumulated in the nacelle, flows into the radiator 13 with an elevated temperature due to heat generated in the generator, the gearbox, or the nacelle to dissipate the heat into an outside atmosphere. An air inlet 14, which is an opening to allow for direct reception of natural wind, is provided at the upwind side of the radiator 13. A path 20 is arranged at the downwind side of the radiator 13 to guide an air flow A, which has passed the radiator, downward of the nacelle 6. An air outlet 15a, which is an exit from the path 20, is provided in the bottom of the nacelle 6 to allow the air to flow to the outside. The radiator 13 is provided to face the wind that flows therein. The wind that has flown through fins of the radiator 13 is introduced toward the air outlet 15a. In this embodiment, an inclined curved surface formed with the supporting member of the radiator 13 and an exterior wall surface of the nacelle 6 is provided as the path 20 from the air inlet 14 at an entrance to the intake surface of the radiator 13 to the air outlet 15a. A maximum use of the height length of the nacelle allows the natural wind, which has flown through the air inlet 14 at the upwind side, to bend toward the air outlet 15a for slow flow toward the bottom of the nacelle, thereby mitigating bend loss. The inclined curved surface may be formed with a plurality of planar inclined walls. The path 20 may be formed with a surface including an exterior wall of the nacelle at the upwind side of the nacelle. The inclined curved surface to form the path 20 may include the exterior wall of the nacelle at the upwind side of the nacelle or a surface of a member supporting the radiator 13. Alternatively, the inclined curved surface may be formed with an extended material of the exterior wall of the nacelle alone. The determination of a wind path is comprehensively based on pressure distribution defined by the shape of the fins of the radiator 13, the shape of an air outlet curved portion 15c, and the shape of the top of the nacelle. Thus, even if the wall of the inclined curved surface receiving the wind is partially perpendicular to the wind, the path 20 of the wind can be formed. The path is a constituent feature that causes an action for introducing a flow with directivity, for example. In the embodiment, the path, which includes a surface inclined with respect to the flowing direction of the air that has passed the radiator 13, introduces the flow to merge with air flows along flank walls of the nacelle, resulting in small loss.

The orientation of the radiator 13 with its intake surface facing upwind can increase pressure at the intake side of the radiator 13. However, if the wind path is not created at the discharge side of the radiator 13, the pressure at the back surface of the radiator 13 does not decrease. Thus, a front-to-back differential pressure, which is needed to allow the wind to flow through the radiator 13, is generated with difficulty. The embodiment achieves the wind power generation system, which is a downwind-type windmill including a radiator upwind of its blades, with the radiator having a sufficient cooling capability without a suction fan, while minimizing a reduction in wind energy toward the blades.

The nacelle 6 desirably has its internal environment separated from its external environment through covering by its exterior wall to isolate devices provided inside, such as the generator, from the outside atmosphere that contains salt. There is also a demand for a compact nacelle to reduce a wind load, and thus, the nacelle is heavily packed with devices inside. A voluminous component, such as piping, with low necessity to be located inside can be placed outside the nacelle to achieve a compact nacelle. Additionally, an increase in volume of the nacelle 6 that is located upwind of the blades may inhibit the flow of the wind, leading to a reduction in efficiency. It is also undesirable to impart an external shape that may cause loss of the wind flow to the nacelle. Furthermore, when the outside atmosphere is introduced into a small space such as the inside of a nacelle merely to allow a radiator or another cooling device to inhibit its flow, continuous introduction of the outside atmosphere is unlikely unless an additional device, such as a fan, is provided to form a discharging flow from the small space.

In a downwind-type windmill, providing the radiator 13, which is located outside the nacelle at the upwind side with the intake surface of the radiator 13 facing the upwind direction, with the path 20, which is formed downstream of the radiator 13 outside the nacelle 6 with, in particular, a surface including the exterior wall of the nacelle for cooling with natural wind, has an effect to alleviate the issues described above.

A louver may be provided at the air inlet 14 to prevent foreign substances from entering or to prepare the flow and control the quantity of the flow of the natural wind.

Provision of the primary air outlet 15a in the bottom of the nacelle 6 has an effect of reducing influence on a wind force applied to the blades 1 downstream of the nacelle and supplying a stable flow of the wind to the blades 1, in comparison with the provision in the top or one of the flanks. The wind flow at the bottom of the nacelle 6 is inherently inhibited by the tower 7, and thus an influence of additional disturbance and loss of the wind flow due to the contoured shape of the nacelle 6, which is located further upstream of the tower, and the air discharged from the nacelle 6 is kept low.

Air outlets 15b are also provided in the flanks of the nacelle 6 where joint portions between the wall surfaces of the radiator 13 at the discharge side and the nacelle 6 are included in the embodiment. This allows for an increased total area of the air outlets in the limited space.

No air outlet is provided in the top of the nacelle 6 to exert no influence on the measuring accuracy of a wind vane and anemometer (not shown), which is often provided on the top of the nacelle 6. It is, however, possible to form the path upward and provide an improved efficiency over a traditional wind power generation system.

Figure 7:
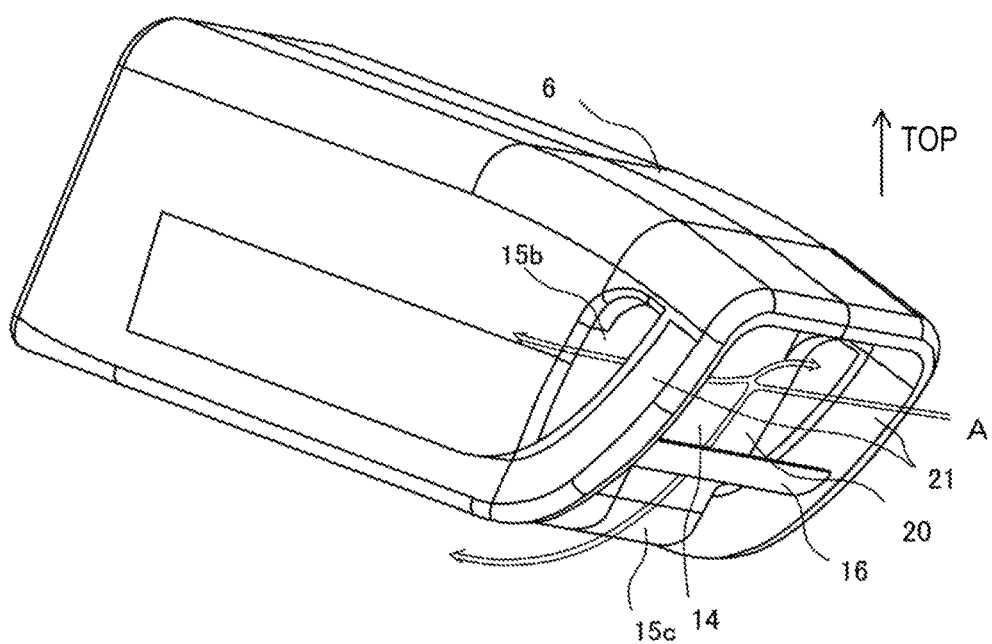
FIG. 7 is a projection of the nacelle of the wind power generation system according to the first embodiment.

FIG. 7 is a projection of a specific example of the nacelle 6 according to the embodiment, on which the radiator 13 is provided. Note that, although the radiator is not illustrated in FIG. 7 to describe a configuration surrounding the radiator 13, the radiator 13 is provided on a radiator supporting member 16. Providing the radiator 13 in a manner such that its top and flanks are in contact with the top wall of the nacelle and flank supporting members 21 can maximize the size of the radiator 13, enabling the radiator 13 to receive efficiently the incoming wind in its entirety or to convert the incoming wind to static pressure for the passage through the radiator 13. Providing the radiator 13 in a manner such that its top is in contact with the inclined surface, which forms the path 20, and the exterior wall of the nacelle can also achieve similarly efficient reception of the wind.

The radiator supporting member 16 is joined at its both ends to the flank supporting members 21. If the air outlets 15b are provided in the flanks of the nacelle, the flank supporting members at both sides of the radiator form bridges at the rear edge of the nacelle from the top toward the bottom of the radiator. If the air outlet 15a for discharge in the lower direction of the nacelle 6 has a sufficient area, the air outlets 15b in the flanks may be excluded. If the air outlets 15b are not provided in the flanks of the nacelle, the flank supporting members 21 for the radiator may be continuous with both of the flank walls of the nacelle 6, imparting stepless appearance together with the flank walls of the nacelle.

Although the radiator supporting member 16 is an elliptic cylindrical component supported by the flank supporting members in FIGS. 2 and 7, the radiator supporting member 16 may be integral in appearance to the flank supporting members 21 at the bottom of the radiator in order to separate the intake surface of the radiator 13 away from the air outlet 15a, depending on the shape of the path 20.

An operation of the wind power generation system will now be described. In the wind power generation system, the nacelle 6 is rotated to allow the rotor 2 at its rotation surface to face the air flow A (yaw control), so that the blades 1 receive a force due to wind energy to rotate the rotor 2. The rotation of the rotor 2 is increased in speed by the gearbox 4 to a rotational speed suitable to the generator 5 for transfer to the generator 5. The generator 5 is rotated to generate electric energy, which is rectified by the power converter 8 and adjusted by the transformer 9 in voltage before transfer to a utility grid. In this process, the generator 5, the power converter 8, the transformer 9, and the like produce heat due to loss from the current passage. The gearbox 4 also generates heat due to loss.

The wind power generation system according to the embodiment employs a water-cooling scheme to which the invention is applied to cool the generator 5 and the gearbox 4. In this cooling scheme, the coolant is circulated between the generator 5 and the gearbox 4 and the radiator 13 by a pump to capture the heat at the generator 5 and the gearbox 4 and allow the radiator 13 provided on the upstream side of the nacelle 6 to dissipate the heat into the outside atmosphere. Note that the scope of the invention is not limited to a water-cooling scheme. For example, the radiator is not limited to one of a water-cooling scheme but may be an oil cooler that cools the oil of the gearbox directly with the outside atmosphere.

With natural wind blowing to allow the wind power generation system to generate power, the radiator 13, which is located on the upwind side of the nacelle 6 in an upright position to face the upwind side, allows the natural wind to flow therein. Although the air flow A, which passes the radiator 13, has a velocity lower than the natural wind due to the radiator 13 and a pressure loss across the radiator 13, the location of the radiator 13 on the most upstream portion of the nacelle 6 allows the radiator 13 to be cooled effectively with the dynamic pressure of the natural wind. This dynamic pressure is wind force energy lost inherently in a downwind-type wind power generation system because of a nacelle located upwind of blades. With the arrangement according to the embodiment, this energy can be used to dissipate heat in the nacelle efficiently.

Additionally, when the output of power generation is high, which entails high natural wind, an air quantity passing the radiator 13 can be increased to improve heat dissipation performance. No energy is wasted as power for a fan, which is not required in the embodiment. In consideration of the offshore installation of the wind power generation system, providing a fan (and a fan motor) including moving parts in the salty and damp external environment of the nacelle 6 poses a risk of failure due to corrosion. Thus, the cooling system with no requirement for a fan will contribute to improved reliability of the wind power generation system. Additionally, the radiator 13 is enclosed in the supporting member extending from the radiator 13 or in the members extending from the exterior of the nacelle 6, and thus, the wind to be applied to the blades 1 is not disturbed by the radiator located upstream of the blades 1. The radiator 13 is also within a projected surface of the nacelle observed in a direction perpendicular to the intake surface of the radiator 13, or in other words, within a wind receiving surface of the nacelle, and thus the projected area of the nacelle 6 including the radiator 13 is minimized with respect to the wind, leading to a reduction in load due to the wind acting on the wind power generation system.

Furthermore, the wind power generation system according to the embodiment includes features as described below in order to allow the natural wind to flow into the radiator 13 more effectively.

The curved portion 15c is provided in the air outlet located at the lower edge of the radiator 13. In other words, the curved portion is provided in the air outlet that is located at a similar height to the upper or lower edge of the radiator. The curved portion is provided at a joining portion between the inclined surface, forming the path 20, of the exterior wall of the nacelle provided from the air inlet 14 toward the air outlet 15a and the bottom of the nacelle. Any structure, including the radiator supporting member 16, located upwind of the curved portion 15c is provided in a manner that does not block a flow of the wind toward the curved portion. The air flowing along the bottom of the nacelle 6 is under no influence of pressure loss of the radiator 13 and the like and, thus, has a higher flow velocity than the discharged air. This air flow further increases its velocity as it flows around the curved portion 15c, generating a local negative pressure region 17. Since the curved portion is provided in the vicinity of the air outlet 15a, the generated negative pressure lowers the pressure in the vicinity of the air outlet 15a, increasing the air quantity taken from the air inlet 14 to pass the radiator 13. Since the location of the curved portion 15c is also close to the lower edge of the radiator 13, the negative pressure directly lowers the pressure at the back surface of the radiator 13, increasing the air quantity passing the radiator 13 with a high probability. Additionally, the air, discharged from the air outlet 15a and having a vector component in the lower direction of the nacelle, bends in the downwind direction along the bottom of the nacelle. The curved portion provided at the position of the bending mitigates pressure loss due to the bending, increasing the air quantity further with a high probability. The size of the curved portion may be, for example, $\frac{1}{5}$ to $\frac{1}{50}$ the height of the nacelle. The size of the curved portion may be desirably, for example, 1/10 to 1/30 the height of the nacelle. The curved portion may not be circular to produce a similar effect.

The air outlets 15a and 15b provided in the bottom and the flanks of the nacelle 6 have a total area greater than that of the core of the radiator 13. The arrangement with the front surface of the radiator 13 facing the upwind side requires that the discharge path 20 be bent significantly at the downstream side of the radiator 13. Thus, the majority of the pressure loss in the path comes from the downstream side of the radiator 13 except for a pressure loss caused by the passage through the radiator 13. Increasing the area of the air outlets sufficiently, at least greater than that of the radiator core, can prevent velocity increase at the downstream side, thereby mitigating an increase in pressure loss in the path. The area of the core of the radiator 13 constitutes the wind receiving area for heat exchange. That the air flow A from the air outlet 15a has a velocity sufficiently lower than that of the air flowing along the bottom of the nacelle 6 and that the outside flow is dominant at the curved portion 15c are of importance also to using the negative pressure region 17 caused at the curved portion 15c as described above.

A feature included in the inside of the radiator 13 is that a direction W in which the coolant flows is a vertical direction. The path arrangement as described above causes the flow that has entered the radiator 13 straight from the upwind side to bend downward (partially sideward) at the downstream side of the radiator 13. The air inlet 14 is also asymmetrical up and down. Hence, the air passing the radiator 13 has a uniform flow velocity distribution in the lateral direction, while it tends to have a nonuniform flow velocity distribution in the vertical direction due to the bent path. By providing vertical paths in pipes of the radiator 13 to allow the coolant to flow in the vertical direction, each one of the pipe paths comes under the influence of the vertically nonuniform air velocity distribution of the radiator 13 alike, which prevents part of the paths from being subjected to significantly low air velocities. This allows the radiator 13 in its entire area to perform the heat exchange efficiently. Note that the provision of the vertical paths in pipes of the radiator 13 produces a similar effect of achieving uniformity for arrangements other than the path arrangement to cause the flow to bend downward.

Second Embodiment

Figure 3:
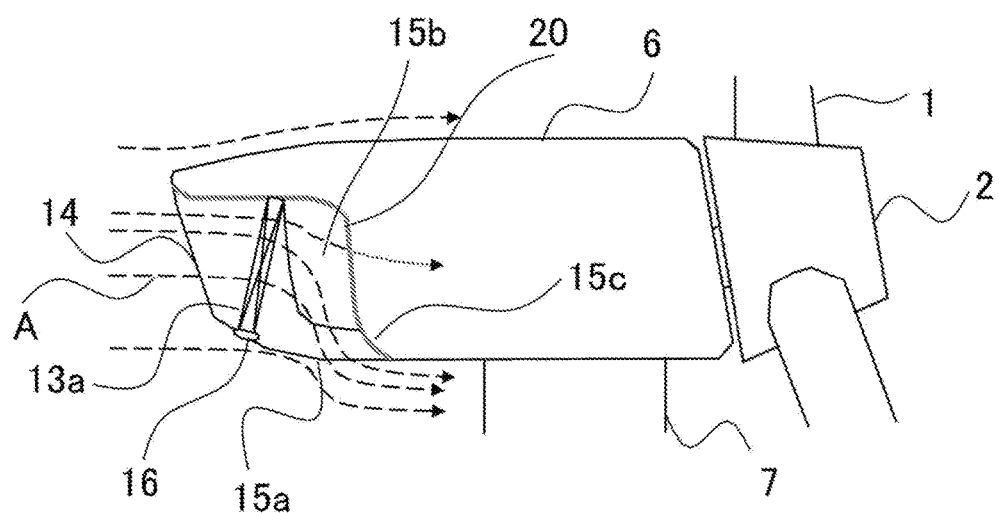
FIG. 3 is a schematic side view of a nacelle of a wind power generation system according to a second embodiment.

A second embodiment of the invention will now be described with reference to FIG. 3. Similar descriptions to the first embodiment will be omitted. FIG. 3 is a schematic side view of a nacelle 6 of a wind power generation system according to this embodiment. Note that FIG. 3 includes a sectional side view of a radiator 13a and its surroundings to describe an arrangement of the radiator 13a. The radiator 13a is inclined with its intake surface facing upward.

While an upright position of the radiator to face upwind is desirable to receive natural wind effectively, a maximized size of the radiator is suitable to ensure cooling capability. In this embodiment, a primary air outlet 15a is provided in the bottom of the nacelle 6. Thus, by inclining the radiator 13a in a manner such that the direction perpendicular to the intake surface of the radiator 13a is slightly raised from the horizontal direction at the upwind side, fins of the radiator 13a, thus tilted downward, acts as guide plates to direct a flow downward. This can alleviate the deflection of the air flow at the back of the radiator 13a, thereby mitigating pressure loss. Inclining the radiator 13a in a limited space in the path, of course, has the effect of maximizing the radiator 13a in size while the radiator 13a is within the projected surface of the nacelle 6.

Third Embodiment

Figure 4:
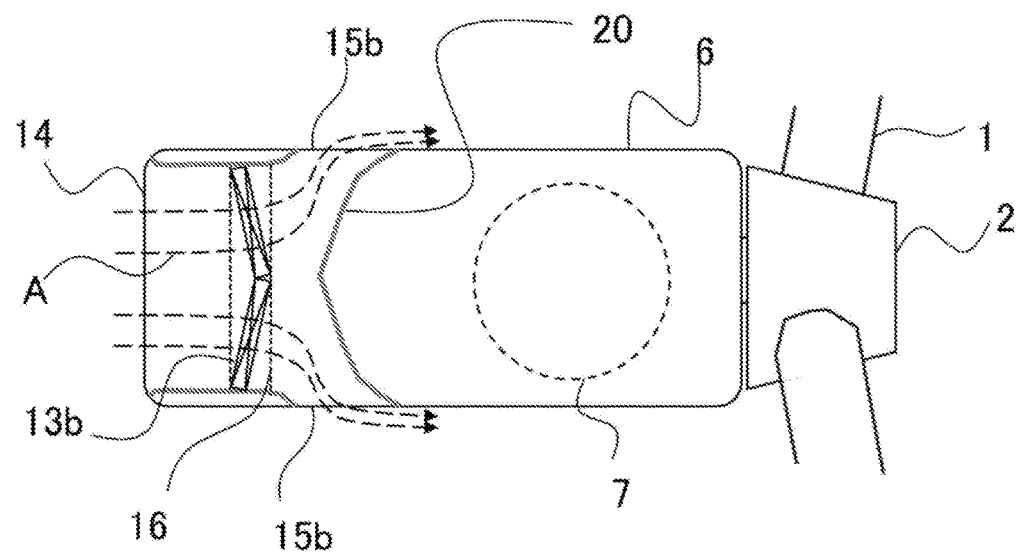
FIG. 4 is a schematic horizontal plan view of a nacelle of a wind power generation system according to a third embodiment.

A third embodiment of the invention will now be described with reference to FIG. 4. Similar descriptions to the embodiments described above will be omitted. FIG. 4 is a schematic horizontal plan view observed from downward of a nacelle 6 of a wind power generation system according to this embodiment. FIG. 4 includes a horizontal section of a radiator 13b and its surroundings to describe an arrangement of the radiator 13b.

In this embodiment, primary air outlets 15b are located in both flanks of the nacelle 6. In the second embodiment described above, the radiator 13a is inclined with its intake surface facing upward. In this embodiment, two radiators are arranged next to each other in the flank direction of the nacelle, with adjoining portions of the two radiators inclined toward blades of the nacelle, in other words, toward the downstream side. In other words, the radiators 13b are inclined so that the adjoining portions of the two radiators 13b are located further downstream with the ends of the radiators 13b near the nacelle flanks located slightly upstream. That is, the two radiators are inclined to together form a recess in the upwind side. In this way, the radiators 13b together having an enlarged size can be provided in a limited space in a path, and pressure loss in the path at the downstream side of the radiator 13b can be mitigated, similarly to the second embodiment.

The radiators 13b may be achieved by one radiator having a recessed shape in the upwind side of the nacelle.

Fourth Embodiment

A fourth embodiment of the invention will now be described with reference to FIG. 5. Similar descriptions to the embodiments described above will be omitted.

Figure 5:
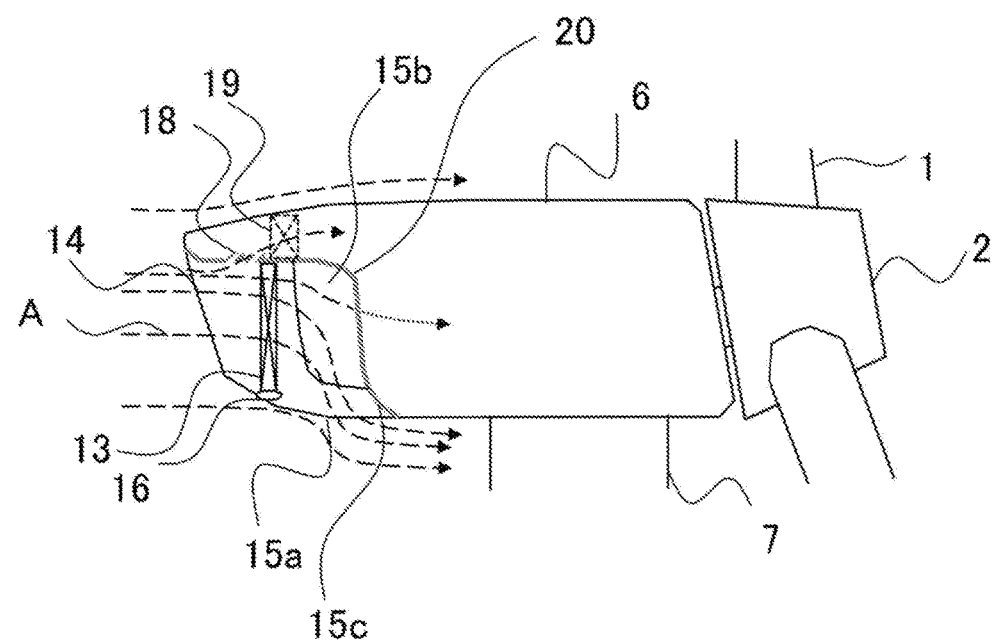
FIG. 5 is a schematic side view of a nacelle of a wind power generation system according to a fourth embodiment.

FIG. 5 is a schematic side view of a nacelle 6 of a wind power generation system according to this embodiment. FIG. 5 includes a sectional side view of a radiator 13 and its surroundings to describe an arrangement of the radiator 13. In this embodiment, an air ventilation intake opening 18 is provided at the upstream side of the radiator 13, which is located at the upwind side of the nacelle 6, for ventilation inside the nacelle 6.

Although a generator 5 and a gearbox 4 located in the nacelle 6 are cooled by the radiator, ambient temperatures in the nacelle 6 tend to increase due to heat dissipation from the surfaces of the generator 5 and the gearbox 4 and heat dissipation from a bearing, electrical devices (such as a control board), and the like. A cold outside atmosphere introduced into the nacelle 6 for ventilation is effective in lowering the temperatures in the nacelle 6. This, however, necessitates providing a fan. The introduction of the outside atmosphere into the nacelle 6 through a method as described in JP 2009-185641 A suffers disadvantages, including possible corrosion and deterioration of devices.

In view of such circumstances, this embodiment employs an arrangement based on discoveries described below to produce a much greater effect than the method described in JP 2009-185641 A. The air after the passage of the radiator 13 with an increased temperature is not suitable for the introduction into the nacelle 6 for lowering the ambient temperatures in the nacelle 6. It is also difficult to introduce the air after the passage of the radiator 13 efficiently due to its lowered air velocity. In contrast, the air at the upstream side of the radiator 13 is suitable for the introduction into the nacelle 6 because it has a certain level of air velocity (dynamic pressure) and a low temperature before the temperature increase. In FIG. 5, the air intake opening 18 is provided at a flank of a path 20 immediately before the radiator 13 so that the air is introduced into the nacelle 6 by pressure increase due to resistance by the radiator 13. Alternatively, the air intake opening 18 may protrude into the path directly so that the air is introduced into the nacelle 6 by the dynamic pressure of natural wind.

A salt damage prevention filter 19 may be provided to allow the air to pass therethrough immediately after the introduction into the nacelle 6 in order to protect devices in the nacelle 6 against salt damage. Although an auxiliary fan may be needed at the downstream side of the filter 19 in a case where the air cannot be introduced sufficiently because of pressure loss due to the filter 19, this fan would require merely a small driving power.

Fifth Embodiment

Figure 6:
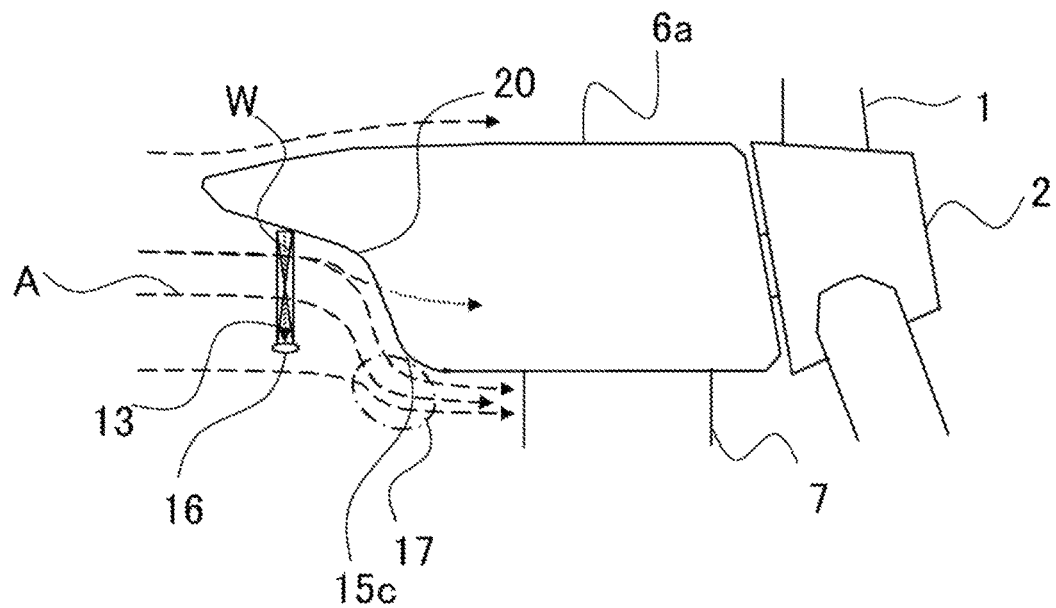
FIG. 6 is a schematic side view of a nacelle of a wind power generation system according to a fifth embodiment.

A fifth embodiment of the invention will now be described with reference to FIG. 6. Similar descriptions to the embodiments described above will be omitted.

In the first embodiment, the radiator 13 is enclosed in the supporting member extending from the radiator 13 or the radiator 13, located outside of the nacelle, is enclosed in the members extending from the exterior of the nacelle as described above. A similar effect is obtained with a radiator 13 that is not covered by the flank supporting members 21 of the radiator 13, if a path 20 is formed with a wall surface including the exterior wall of the nacelle. In this embodiment, like the embodiments described above, a radiator 13, together with a path upstream and downstream of the radiator 13, is provided in an external environment similar to that at the upwind side of a nacelle 6a from the viewpoint of salt content and humidity of the ambient air. In other words, the nacelle 6a has a casing made of a top, a bottom, flanks, a surface on which blades are provided, and an inclined exterior wall at the upwind side of the nacelle. The path may be formed of the inclined exterior wall alone or may include a supporting member of the radiator 13.

In this embodiment, a wind power generation system includes: blades configured to be rotated by wind; a generator configured to be driven by the rotation of the blades to generate power; a nacelle supporting the blades; and a tower supporting the nacelle rotatably, the wind power generation system being configured to receive the wind at a side opposite to a side of the nacelle on which the blades are provided, the system includes a radiator configured to dissipate heat in the nacelle through a cooling medium, wherein the nacelle has a shape with the top protruding farther than the bottom in the upwind direction, the radiator is provided below the protrusion, and the radiator is provided with an intake surface thereof facing the upwind direction of the nacelle.

To secure the radiator 13, a radiator supporting member 16 is formed into an undepicted frame to secure the radiator 13 to a protrusion of the top of the nacelle. Alternatively, the bottom may be protruded farther than the top to form a path to introduce the wind upward of the nacelle. Alternatively, a wall of a flank of the nacelle may be extended to protrude in the upwind direction so that a path is formed to introduce the wind in the flank direction.

The top protrusion at the upwind side of the nacelle may be a casing protected by a frame. A device and a cooling medium pipe may be disposed in the top protrusion. The top protrusion may include a route to introduce the outside atmosphere from the protrusion into the nacelle. Alternatively, the top protrusion may be simply the nacelle top wall extending in the rear direction to protrude like a visor.

If the radiator 13 is exposed with no covering by a structure or the like, the radiator 13 may have an increased resistance due to its shape involving projections and depressions and thus cause an increased wind load to the nacelle, leading to possible disturbance of a wind flow applied to the blades in the downstream. If the radiator and its surroundings are not covered by a structure or the like, the wind that has struck the radiator 13 may pass around the radiator 13 because of an increased pressure in the vicinity of the intake surface of the radiator, leading to possible deterioration of cooling efficiency with respect to an air quantity. In order to alleviate such possibilities, the radiator 13 may be covered by a covering, not shown in FIG. 6, having an air inlet and an air outlet, similarly to the nacelle in the first embodiment. Alternatively, the radiator 13 may be covered at its flanks by flank supporting members 21 described in FIG. 7. Alternatively, the radiator 13 may be enclosed by a member supporting the radiator on the nacelle. When the radiator 13 is enclosed, the radiator is at its ends in contact with or in proximity to a structure having a thickness greater than that of the radiator in the radiator thickness direction.

In this embodiment, any of the arrangements described in the first to fourth embodiments may be employed. For example, a curved portion 15c may be provided at a joining portion between an inclined curved surface below the protrusion and the bottom of the nacelle.

Some embodiments of the invention have been described above merely to provide a few examples, and the invention is not limited thereto. For example, in a case in which a device other than a generator or a gearbox is to be cooled, or in a case in which oil is used as a cooling medium, a desired effect will be obtained with similar arrangements of a radiator for heat dissipation and a path, and these are within the scope of the invention.

For a wind power generation system that cools its devices through cooling with a radiator by natural wind, the invention can provide the wind power generation system including a low cost and efficient cooling system that allows for a small sized nacelle and provides good cooling by allowing a minimum necessary radiator to receive the air efficiently. This system uses the natural wind for cooling without a fan operating outside a tower, so that power consumption by a fan is eliminated to improve energy saving and that necessary cooling capability can be provided in the event of the failure of the fan, lowering a risk of unexpected stoppage or output limiting operation of the wind power generation system.

What is claimed is:

1. A wind power generation system including:
blades configured to be rotated by wind;
a generator configured to be driven by the rotation of the blades to generate power;
a nacelle supporting the blades; and
a tower supporting the nacelle rotatably,
the wind power generation system being configured to receive the wind at a side opposite to a side of the nacelle on which the blades are provided,
the system comprising a radiator configured to dissipate heat in the nacelle through a cooling medium, wherein the radiator is provided outside the nacelle on an upwind side of the nacelle, the radiator is provided with an intake surface thereof facing an upwind direction, a path is formed downstream of the radiator to guide the wind that has passed the radiator, the path is formed with a surface including an exterior wall of the nacelle on the upwind side of the nacelle, the nacelle includes a bent portion located at the outlet of the path in which the nacelle receives a flow of air that does not pass through the radiator.

2. The wind power generation system according to claim 1, wherein
a curved portion is provided at an exit from the path.

3. The wind power generation system according to claim 1, wherein
the radiator is enclosed by a member supporting the radiator on the nacelle.

4. The wind power generation system according to claim 1, wherein
the radiator is provided in a manner such that the radiator is within a projected surface of the nacelle observed in a direction perpendicular to the intake surface of the radiator.

5. The wind power generation system according to claim 1, wherein
exits from the path have a total area greater than that of a core of the radiator.

6. The wind power generation system according to claim 1, wherein
the radiator is provided in a manner such that a joining portion between an exterior wall, forming the path, of the nacelle and a flank of the nacelle is at a similar height to an end of the radiator.

7. The wind power generation system according to claim 1, wherein
the cooling medium inside the radiator flows in a vertical direction.

8. The wind power generation system according to claim 1, wherein
the radiator is provided in a manner such that a direction perpendicular to the intake surface of the radiator is inclined upward from a horizontal direction at the upwind side.

9. The wind power generation system according to claim 1, wherein
a measuring device configured to measure the wind is provided on the nacelle at a top thereof.

10. The wind power generation system according to claim 1, wherein
air outlets from the path are provided in flanks of the nacelle.

11. The wind power generation system according to claim 10, wherein
the radiator is achieved by one of a radiator having a recessed shape in the upwind direction of the nacelle and two radiators inclined to form a recess in the upwind direction of the nacelle.

12. The wind power generation system according to claim 1, wherein
an intake opening for ventilation of the nacelle is provided upstream of the radiator.

13. The wind power generation system according to claim 12, wherein
a salt damage prevention filter is provided in a path connected to the ventilation intake opening.

14. A wind power generation system including:
blades configured to be rotated by wind;
a generator configured to be driven by the rotation of the blades to generate power;
a nacelle supporting the blades; and
a tower supporting the nacelle rotatably,
the wind power generation system being configured to receive the wind at a side opposite to a side of the nacelle on which the blades are provided,
the system comprising a radiator configured to dissipate heat in the nacelle through a cooling medium, wherein
the nacelle has a shape with one end thereof protruding farther than another end thereof in an upwind direction, the radiator is provided on the protrusion,
the radiator is provided with an intake surface thereof facing an upwind direction of the nacelle,
a path is formed with a surface including an exterior wall of the nacelle on the upwind side of the nacelle, and
the nacelle includes a bent portion located at the outlet of the path in which the nacelle receives a flow of air that does not pass through the radiator.

15. The wind power generation system according to claim 14, wherein
a path is formed with a wall surface including an exterior wall of the nacelle to guide the wind that has passed the radiator, the exterior wall of the nacelle being on the protrusion on which the radiator is provided.

* * * * *